United States Patent [19]

Shikano

[11] Patent Number: 5,477,521
[45] Date of Patent: Dec. 19, 1995

[54] PRISM FOR AN OPTICAL PICKUP OF AN OPTICAL RECORDING AND REPRODUCING DEVICE

[75] Inventor: Yoshinori Shikano, Tokorozawa, Japan

[73] Assignee: Pioneer Electronic Corp., Tokyo, Japan

[21] Appl. No.: 226,382

[22] Filed: Apr. 12, 1994

Related U.S. Application Data

[63] Continuation of Ser. No. 914,135, Jul. 11, 1992, abandoned.

[30] Foreign Application Priority Data

Nov. 6, 1991 [JP] Japan ..................................... 3-318468

[51] Int. Cl.$^6$ .................................................... G11B 7/135
[52] U.S. Cl. ........................ 369/112; 369/110; 369/44.37; 369/44.12
[58] Field of Search ............................ 369/44.37, 44.11, 369/44.12, 44.41, 112, 110, 44.14, 13

[56] References Cited

U.S. PATENT DOCUMENTS

| | | | |
|---|---|---|---|
| 4,505,584 | 3/1985 | Kato et al. ............................ | 369/44.14 |
| 5,150,350 | 9/1992 | Aikoh et al. ............................ | 369/112 |
| 5,151,889 | 9/1992 | Saimi et al. ............................ | 369/112 |

*Primary Examiner*—Georgia Y. Epps
*Assistant Examiner*—Muhammad N. Edun
*Attorney, Agent, or Firm*—Nikaido, Marmelstein, Murray & Oram

[57] ABSTRACT

An optical pickup for a magneto-optical disc has a prism for transmitting light reflected on the magneto-optical disc to a detector. The prism comprises a triangular portion, a plate portion, and a polarizing film interposed between the triangular portion and the plate portion for splitting the light to a first polarized component and a second polarized component. The refractive index of the plate portion is larger than the refractive index of the triangular portion. Thus, the first polarized component passing the plate portion reflects at a point on a rear surface of the plate portion near the second polarized component.

3 Claims, 6 Drawing Sheets

PRISM FOR AN OPTICAL PICKUP OF AN OPTICAL RECORDING AND REPRODUCING DEVICE

This application is a continuation of application Ser. No. 07/914,135 filed Jul. 17, 1992, now abandoned.

BACKGROUND OF THE INVENTION

The present invention relates to an optical pickup of an optical device capable of recording information on magneto-optical disc and reproducing the information.

There are optical discs such as a write once (WORM) disc and a magneto-optical disc. These discs are different from the CD in the material of the recording surface.

For example, a WORM disc has a tellurium or bismuth recording surface on which the lasers burn pits for recording. In another type of WORM disks, the lasers are focused on a recording surface coated with a selenium antimony ($Sb_2Se_3$) thin film, or an oxide tellurium (TeOx) thin film, or a thin film of organic pigment, changing the reflectivity of the light.

The magneto-optical disc uses as the recording surface, an amorphous alloy made of rare earth metals such as gallium, terbium, and others. In a magneto-optical recording method, the recording surface of the disc is initially magnetized to form a magnetic field in a direction perpendicular to the surface. The laser heats a predetermined area of the disc to elevate the temperature above Curie temperature, which is about 150° C., thereby reversing the direction of the magnetic field. To read the recorded information, the laser is irradiated on the recording surface so that polarized wave front slightly rotates as a result of the Kerr effect. Thus only the polarized wave deflected by the rotation is read by a photodetector, thereby enabling to read the information.

In order to read the recorded information, a focus servo system and a tracking servo system are provided for maintaining the distance between the recording surface and a pickup constant.

FIG. 5 schematically shows a conventional optical system of a pickup in a magneto-optical reproducing system. Laser reflected from a magneto-optical disc (not shown) enters a prism 2 through a convex lens 1. The prism 2 has a triangular portion 2a, a rectangular plate portion 2b, and a polarizing film 2c interposed between the portions 2a and 2b. The polarizing film 2c allows only the P(parallel)-polarization component of the reflected light to pass through. Therefore, the S(senkrecht)-polarization component of the reflected light passing through the plate portion 2a is reflected at a reflecting surface thereof and applied to a photodetector 3. On the other hand, the P-polarization component passes through the polarizing film 2c and the rectangular plate portion 2b, and is reflected at a rear surface of the plate portion 2b, and applied to the detector 3.

Referring to FIG. 6, the detector 3 has two detecting areas PD1 and PD2 for receiving spots of light of the S-polarization component and the P-polarization component, respectively. The areas PD1 and PD2 are divided into three sections to generate outputs A, B, and C, and A', B', and C', respectively.

A focus error signal $F_E$ is obtained using a spot size method, wherein sizes of spots formed by the S-polarization component and P-polarization component are compared with each other. As shown in FIG. 7, the focus error signal $F_E$ is calculated as follows.

$$F_E=(A+C-B)-(A'+C'-B')$$

When the spot sizes formed on the respective detecting areas PD1 and PD2 are equal to each other, the error signal $F_E$ is zero. This means that the laser is appropriately focused on the disc. FIG. 8 shows such a state, where a focus F of the lens 1 is properly located. When the spot size of the S-polarization component on the area PD1 is larger than that of the P-polarization component formed on the are a PD2, the error signal $F_E$ is larger than zero. FIG. 9 shows such a state, where the focus F is far away from the prism 2. Namely, an objective is too close to the recording surface.

To the contrary, if the spot size formed by the S-polarization component is smaller than the spot size formed by the P-polarization component than the spot size formed by the P-polarization component as shown in FIG. 10, $F_E$ is smaller than zero. Hence, the focus F is close to the prism 2, indicating that the objective is too far from the disc. Therefore, the objective must be moved to the disk.

Thus, the focus servo system operates to maintain the appropriate position of the objective where the spot sizes-on the detecting areas PD1 and PD2 become equal.

FIG. 11 shows an example of a calculating circuit for producing an RF signal which represents information retrieved from the optical disc. In the example, the data signal RF is obtained by calculating a difference between the S-polarization component and the P-polarization component detected by the detecting areas PD1 and PD2, respectively, as follows.

$$RF=(A+B+C)-(A'+B'+C')$$

In the optical system using the spot size method, the dynamic range of the system can be improved by increasing the spot sizes. This can be attained by increasing the thickness of the rectangular plate portion 2b of the prism 2. Namely, as shown in FIGS. 12 and 13, when the thickness t is increased, the distance between focuses F1 and F2 increases, so that the spots are enlarged from d1 to d2. Thus, the dynamic range is increased. However, the increase of the thickness of the plate 2b also causes a distance D between the S-polarization component and P-polarization component applied to the detector 3 to increase to D1. Accordingly the distance between the detecting areas PD1 and PD2 must be increased, so that the detector 3, and hence the optical pickup becomes large.

SUMMARY OF THE INVENTION

An object of the present invention is to provide an optical system of a pickup for a magneto-optical reproducing system where a dynamic range thereof may be increased without increasing the size of the pickup.

According to the present invention, there is provided an optical pickup for a magneto-optical disk where light reflected on the magneto-optical disk is transmitted to a detector through a prism comprising a triangular portion, a plate portion, and a polarizing film interposed between the triangular portion and the plate portion, characterized in that the refractive index of the plate portion is different from the refractive index of the triangular portion so that a one of polarized components passing the plate portion reflects at a point on a rear surface of the plate portion near the other polarized component.

The light reflected from the disk is split into S-polarization component which is reflected by the boundary surface of the triangular portion and P-polarization component which passes through the polarizing film and reflected on the rear surface of the plate portion, each of which is detected by the detector. Since the index of refraction of the plate portion is larger than that of the triangular portion, the P-polarization component is deflected upon entering the plate portion, thereby decreasing the distance between the beams of the S-polarization component and the P-polarization component leading to the detector. As a result, the thickness of the plate portion of the prism can be increased so that the dynamic range of the pickup is increased without increasing the size of the pickup.

The other objects and features of this invention will become understood from the following description with reference to the accompanying drawings.

DETAILED DESCRIPTION OF THE PREFERRED EMBODIMENT

Figure 1:
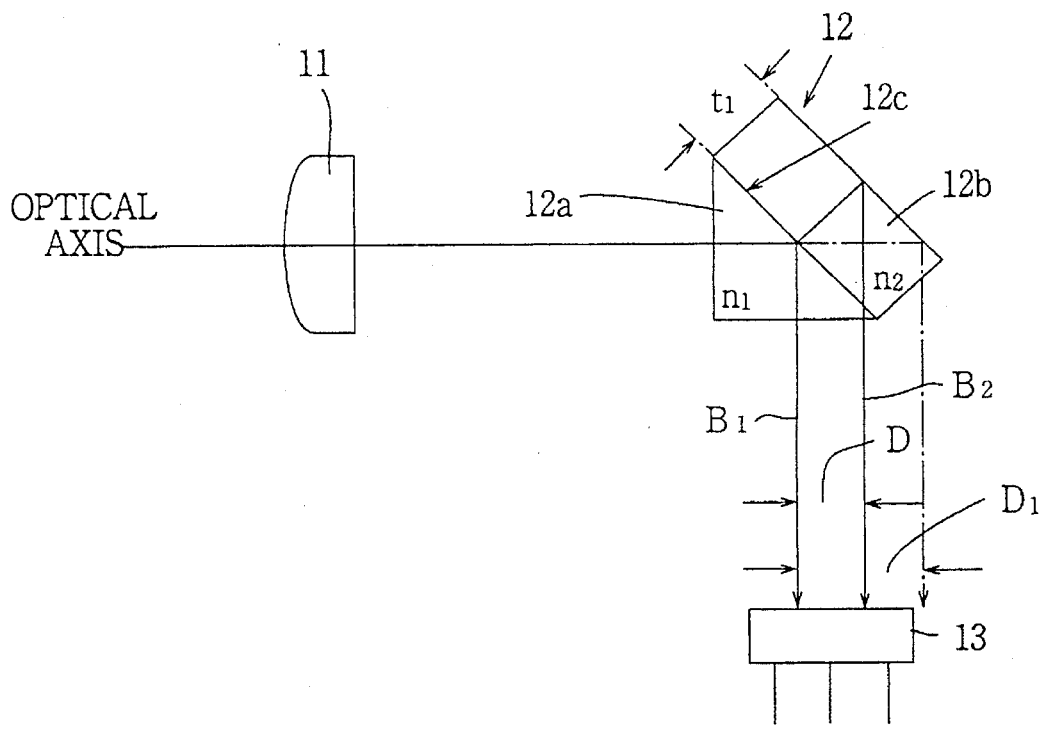
FIG. 1 schematically shows an optical pickup for a magneto-optical reproducing device according to the present invention.
Figure 12:
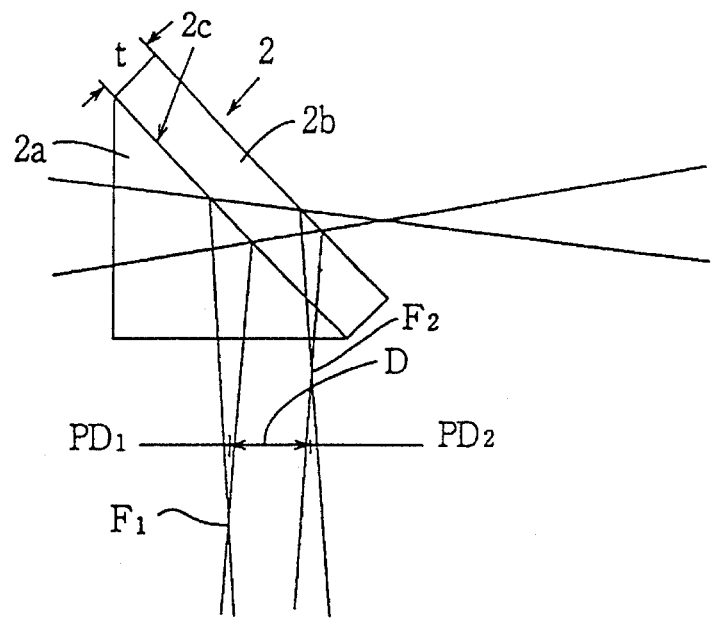
FIG. 12 is a diagram explaining the operation of the conventional optical pickup.
Figure 13:
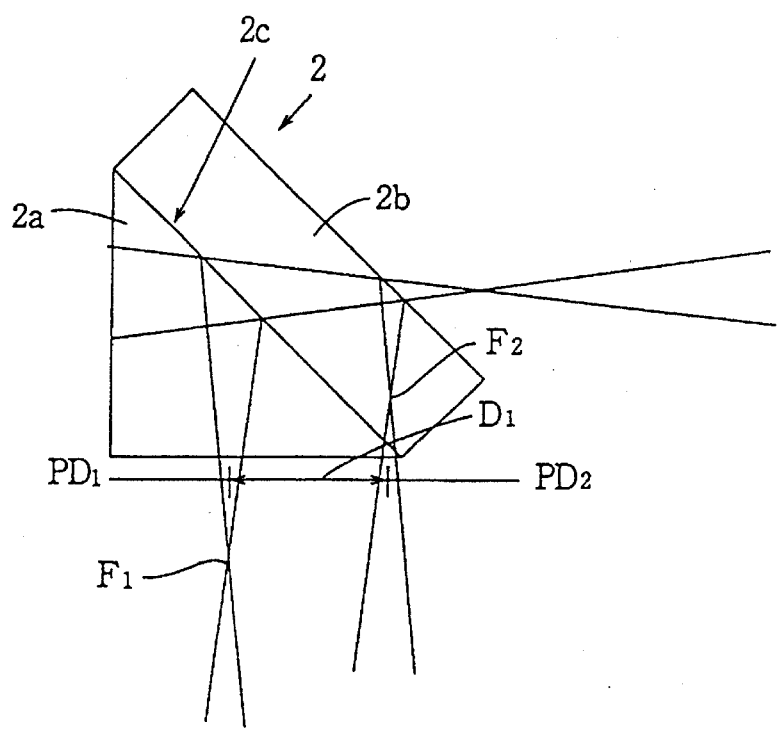
FIG. 13 is a diagram explaining the operation of a prism having an increased thickness.

Referring to FIG. 1, an optical pickup of the present invention comprises a convex lens 11, a prism 12 and a detector 13. The prism 12 has a triangular portion 12a, a rectangular plate portion 12b, and a polarizing film 12c. The thickness t1 of the plate portion 12b is larger than the thickness t of the plate portion of FIG. 12. The materials for the triangular portion 12a and the plate portion 12b are different from each other. Namely, the prism 12 is so adapted that the refractive index n1 of the triangular portion 12a is smaller than the refractive index n2 of the rectangular plate portion 12b.

Figure 2:
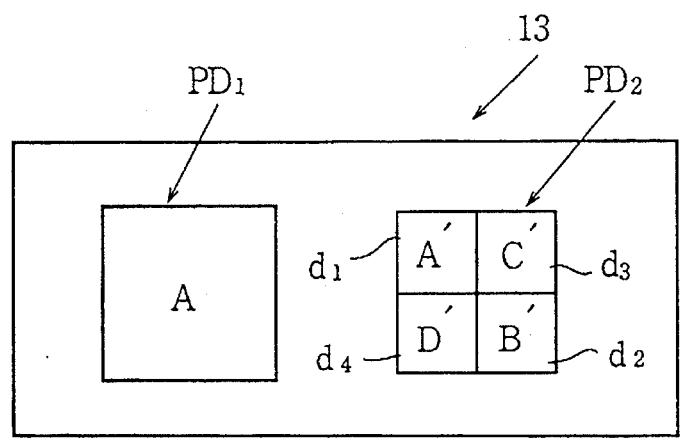
FIG. 2 shows detecting areas of a detector provided in the portion pickup.

Referring to FIG. 2, the detector 13 has the detecting area PD1 for detecting the beam B1 of the S-polarization component and the beam B2 of the detecting area PD2 for detecting the P-polarization component. The beam B2 becomes an astigmatic pencil of rays. Therefore, in the embodiment, an astigmatic method is used. Accordingly, the area PD2 is split into four quadrates d1 to d4 so as to detect the shape of the spot of the astigmatic pencil of rays on the area PD2.

In operation, S-polarization component of the beam is reflected on the boundary surface of the triangular portion 12a. On the other hand, the P-polarization component passes through the polarizing film 12c and is refracted upwardly as shown by a solid line in FIG. 1 because of the difference between the refractive indexes n1 and n2. Thereafter, the P-polarization component is reflected on the rear surface of the rectangular plate portion to be transmitted to the detecting area PD2. Thus, the beam B2 is positioned near the beam B1.

Figure 3:
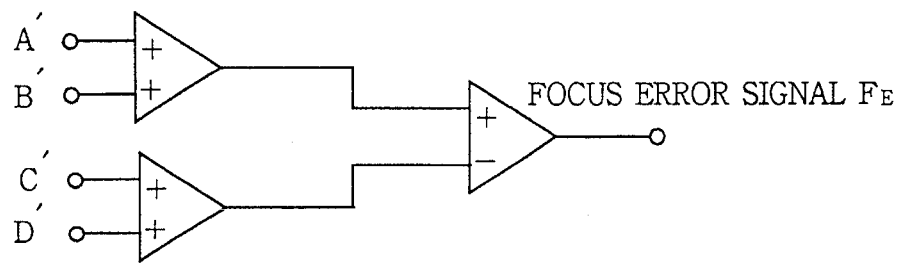
FIG. 3 shows a calculating circuit for obtaining a focus error signal from the outputs of the detector.

The focus error signal $F_E$ is calculated in accordance with a circuit shown in FIG. 3, based on the outputs A', B', C' and D' detected by each of the four quandrates d1 to d4, which is expressed as follows.

$$F_E = (A'+B')-(C'+D')$$

If the shape of the spot formed on the detecting area PD2 of the detector 3 is an ellipse extending in the diagonal sections d1 and d2 or the sections d3 and d4, the result of the calculation is either larger or smaller than zero. If the beam is properly focused, the spot becomes circular. Thus, the focus servo system is operated to adjust the position of the pickup until the spot becomes circular, where Fe is zero.

Figure 4:
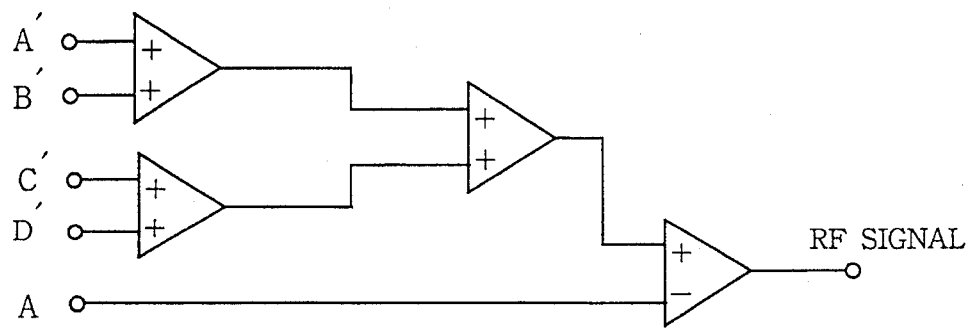
FIG. 4 shows a calculating circuit for obtaining an RF signal from the outputs of the detector.
Figure 5:
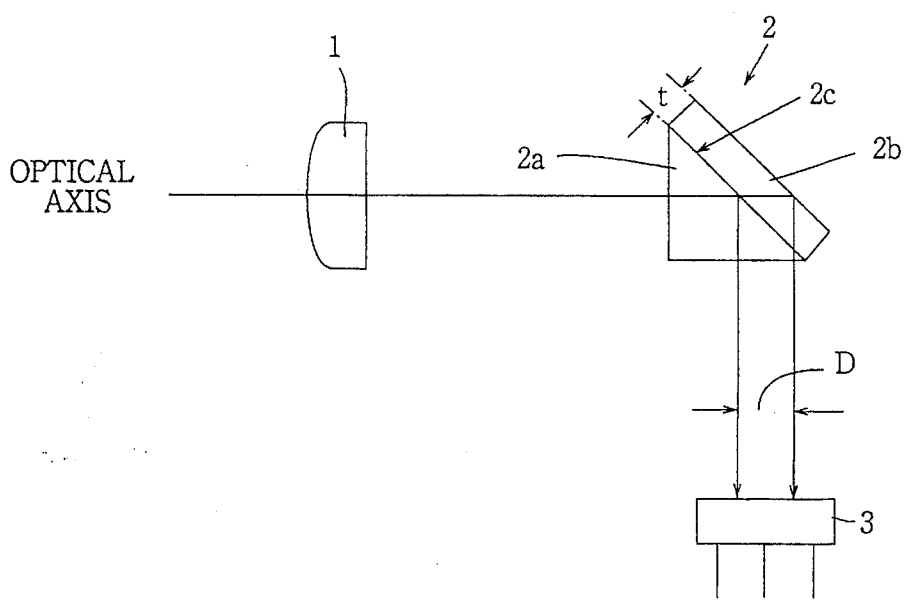
FIG. 5 schematically shows a part of a conventional optical pickup.
Figure 6:
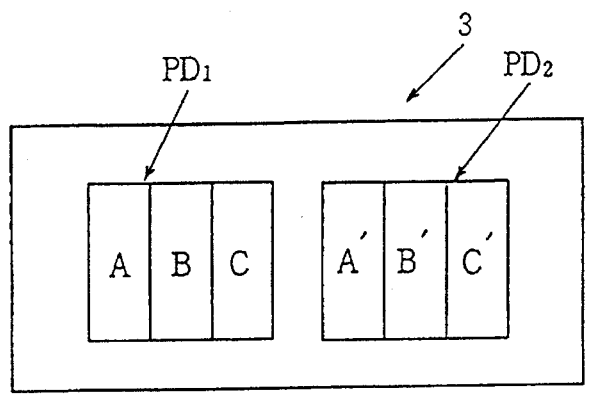
FIG. 6 shows detecting areas of a detector provided in the conventional optical pickup.
Figure 7:
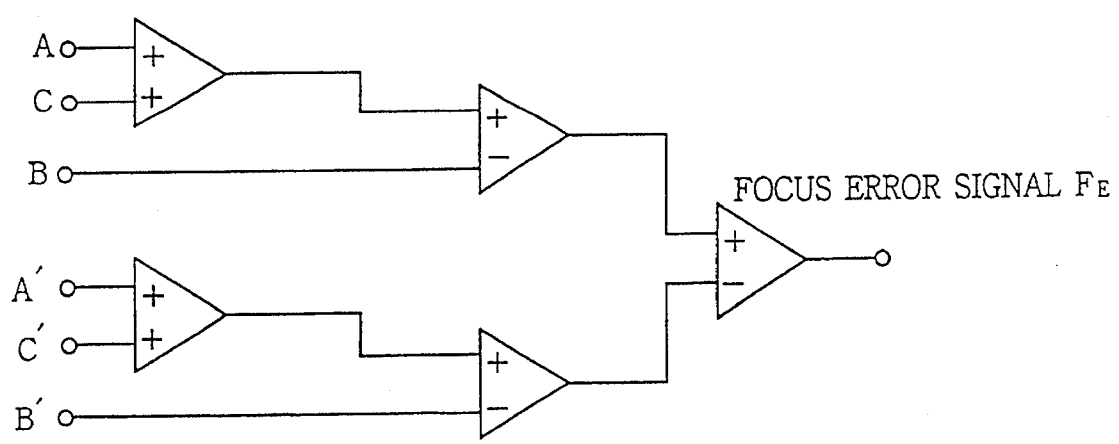
FIG. 7 shows a calculating circuit for obtaining a focus error signal from the outputs of the detector.
Figure 8:
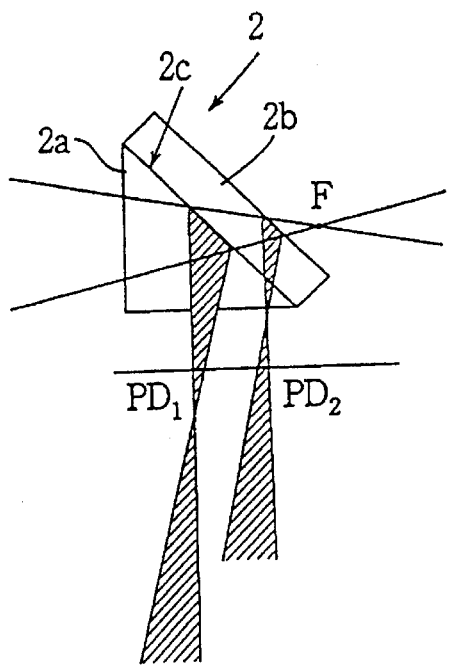
FIGS. 8 to 10 show various courses of reflections of light from a disc for explaining the operation of a focus servo system of the conventional optical system.
Figure 9:
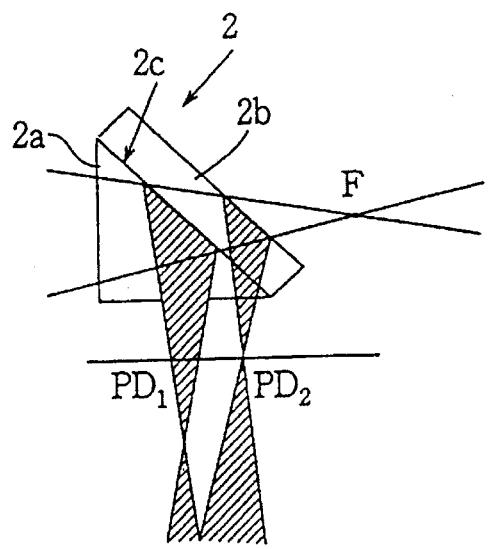
Figure 10:
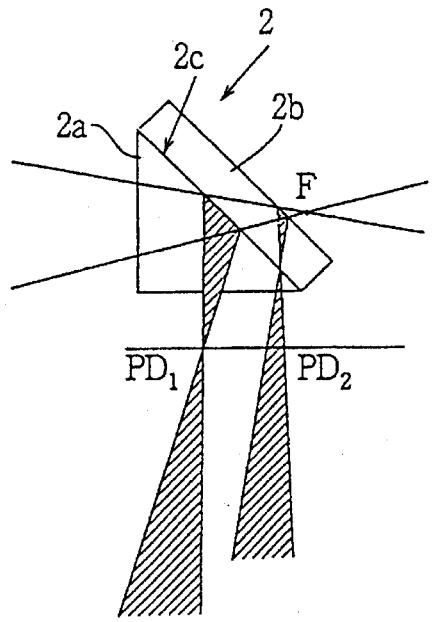
Figure 11:
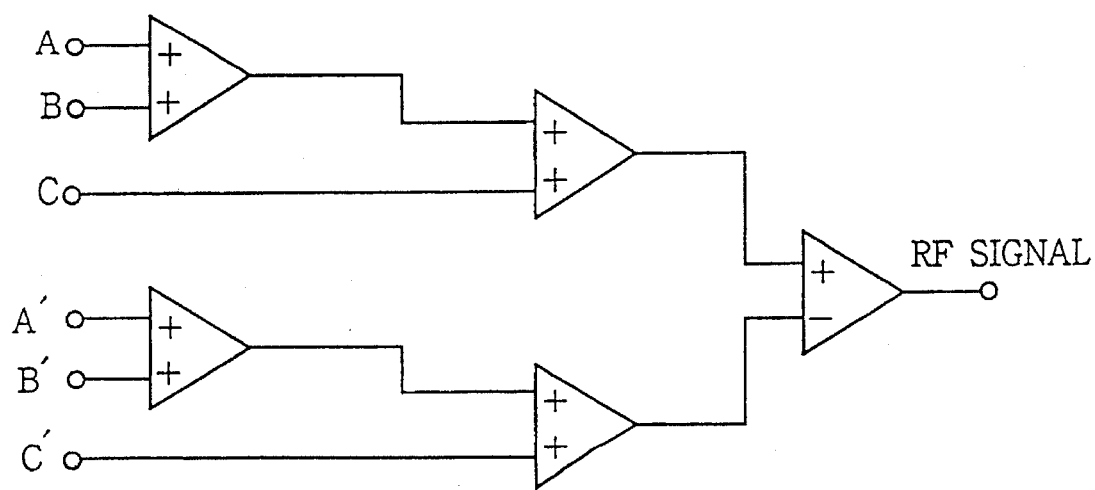
FIG. 11 show a calculating circuit for obtaining an RF signal from the outputs of the detector.

The RF signal is calculated as shown in FIG. 4, or in accordance with the following equation.

$$RF = (A'+B'+C'+D')-A$$

where A is the output of the detecting area PD1.

Thus, in accordance with the present invention, since the refractive index n2 of the rectangular plate portion is larger than the refractive index n1 of the triangular portion, the beam B2 of the P-polarization component takes a path closer to the beam B1 of the S-polarization component than in a system shown by a dash dot line in FIG. 1, where the refractive indexes are the same (n1=n2). Consequently, the distance D between the beams of the S-polarization component and P-polarization component is not increased, although the rectangular plate portion has an increased thickness. Hence the dynamic range of the optical pickup is increased without increasing the size of the pickup.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. An optical pickup for a magneto-optical disk, the optical pickup comprising:

a prism for transmitting light reflected on the magneto-optical disk to a detector, the prism including a triangular portion, a plate portion, and a polarizing film interposed between the triangular portion and the plate portion for splitting the light into a first polarized component and a second polarized component, wherein a refractive index of the plate portion is different from a refractive index of the triangular portion so that the first polarized component passing through the plate portion reflects at a point on a rear surface of the plate portion near the second polarized component and wherein the refractive index of the plate portion is larger than the refractive index of the triangular portion.

2. An optical pickup according to claim 1 wherein detector for detecting the first polarized component is split into four quadrates for focusing the light by an astigmatic method.

3. An optical pickup for a magneto-optical disk, the pickup comprising:

a prism for transmitting light reflected on the magneto-optical disk to a detector, the prism including a triangular portion, a plate portion, and a polarizing film interposed between the triangular portion and the plate portion for splitting the light into a first polarized component which passes through the polarizing film and a second polarized component so that the first polarized component is reflected at a first point located at a rear surface of the plate portion and the second polarized component is reflected at a second point located at a rear surface of the triangular portion, wherein a refractive index of the plate portion is larger than a refractive index of the triangular portion so that the first polarized component passing through the plate portion is refracted when passing from the triangular portion to the plate portion, and is reflected at the first point which is located closer to the second point than a third point at which a straight passing nonrefracted first polarized component is to be reflected on the rear surface of the plate portion wherein a distance between the reflected first polarized component and the reflected second polarized component is less than a distance between the reflected straight passing nonrefracted first polarized component and the reflected second polarized component.

* * * * *

UNITED STATES PATENT AND TRADEMARK OFFICE
CERTIFICATE OF CORRECTION

PATENT NO. : 5,477,521
DATED : December 19, 1995
INVENTOR(S) : SHIKANO

It is certified that error appears in the above-indentified patent and that said Letters Patent is hereby corrected as shown below:

Title Page: Item

[63] delete "July 11, 1992" and insert therefor -- July 17, 1992--.

Signed and Sealed this

Twenty-third Day of July, 1996

Attest:

BRUCE LEHMAN

Attesting Officer        Commissioner of Patents and Trademarks